(12) United States Patent
Bert

(10) Patent No.: US 8,838,891 B2
(45) Date of Patent: Sep. 16, 2014

(54) SSD CACHE EXPANSION USING OVERPROVISIONED SPACE

(75) Inventor: Luca Bert, Cumming, GA (US)

(73) Assignee: LSI Corporation, San Jose, CA (US)

( * ) Notice: Subject to any disclaimer, the term of this patent is extended or adjusted under 35 U.S.C. 154(b) by 283 days.

(21) Appl. No.: 13/534,595

(22) Filed: Jun. 27, 2012

(65) Prior Publication Data

US 2013/0275672 A1 Oct. 17, 2013

Related U.S. Application Data

(60) Provisional application No. 61/623,771, filed on Apr. 13, 2012.

(51) Int. Cl.
*G06F 12/08* (2006.01)
(52) U.S. Cl.
USPC .......... 711/114; 711/122; 711/E12.019; 711/E12.024

(58) Field of Classification Search
USPC .......... 711/114, 122, E12.019, E12.024
See application file for complete search history.

(56) References Cited

U.S. PATENT DOCUMENTS

| 2011/0099320 A1 | 4/2011 | Lucas et al. |
| 2011/0173378 A1 | 7/2011 | Filor et al. |

*Primary Examiner* — Yong Choe
(74) *Attorney, Agent, or Firm* — Suiter Swantz pc llo

(57) ABSTRACT

The invention provides for SSD cache expansion by assigning all excess overprovisioned space (OP) above a level of advertised SSD memory to SSD cache. As additional SSD memory is needed to provide the advertised SSD memory, an offsetting portion of the OP is reassigned from excess overprovisioned space to the SSD cache. In this manner, the advertised SSD memory is maintained while continuously allocating all available excess OP to cache. The result is that all of the available SSD memory is allocated to cache, a portion to maintain the advertised SSD memory and the balance as excess OP allocated to cache. This eliminates idle OP in the SSD allocation.

20 Claims, 3 Drawing Sheets

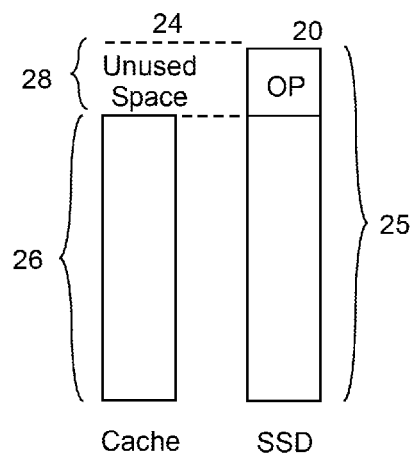
FIG. 2A
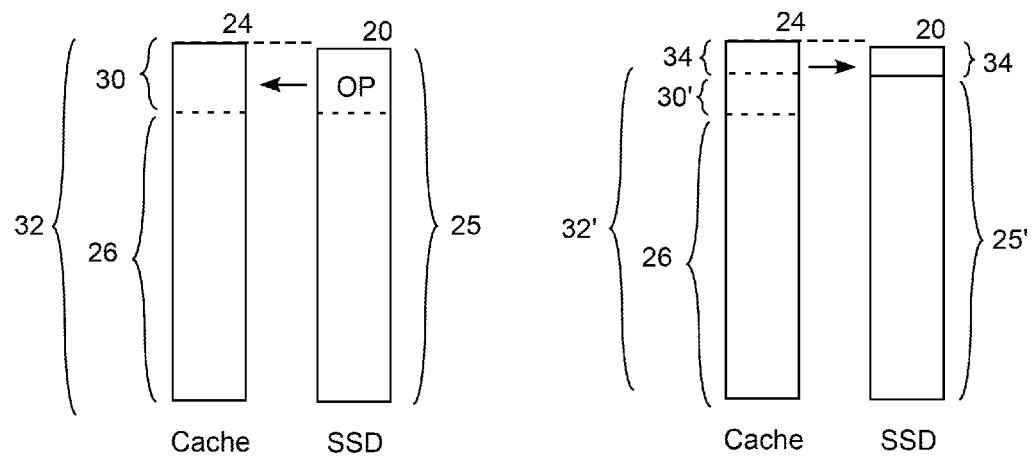
FIG. 2B          FIG. 2C

SSD CACHE EXPANSION USING OVERPROVISIONED SPACE

CROSS REFERENCE TO RELATED APPLICATION

The present application claims the benefit under 35 U.S.C. §119 to U.S. Provisional Patent Application Ser. No. 61/623,771 filed Apr. 13, 2012. Said U.S. Provisional Patent Application Ser. No. 61/623,771 filed Apr. 13, 2012 is hereby incorporated by reference in its entirety.

TECHNICAL FIELD

The present invention relates to the use of a Solid State Device (SSD) to provide cache memory in Advanced Storage Device (ASD) systems and, more particularly, to the expansion of SSD cache using overprovisioned space on the SSD memory device

BACKGROUND

Solid State Devices (SSDs) can be used to provide cache memory to enhance the operation of Advanced Storage Device (ASD) systems. SSDs provide relatively expensive memory with much faster read and write times in comparison to the attached hard drives that provide the permanent memory in an ASD system. A relatively small amount of SSD cache (in comparison to the amount of permanent memory in the ASD system) may therefore be configured as temporary cache memory space for frequently accessed data, sometimes referred to as "hot data," to avoid read and write latency inherent in the hard drives. In conventional SSD cache systems, the SSD memories typically include unused space that remains idle during normal computer operations. Due to the expense and desire to maximize the amount of SSD cache available in the ASD system, there is a continuing need for methods for increasing the size of SSD cache. More particularly, there is a need for eliminating idle SSD memory so that all of the available SSD physical memory is use as cache in the ordinary operation of the host computer system. The importance of this is largely related to the fact that cache performance depends mainly on cache size assuming everything else being the same, so that the ability to put idle space in use for cache proportionally improves the subsystem performance.

SUMMARY

The invention provides for SSD cache expansion by assigning all of the excess overprovisioned space (OP) above the level of advertised SSD memory to SSD cache. As additional SSD memory is needed to maintain the advertised SSD capacity, an offsetting portion of the OP is reassigned from excess overprovisioned space to maintain the advertised SSD capacity and the adjusted amount of excess OP is allocated to SSD cache. In this manner, the advertised SSD memory is maintained while continuously allocating all available excess OP to cache. The result is that all of the available SSD memory is allocated to cache with a portion used to maintain the advertised SSD memory capacity and the balance of the excess OP allocated to cache. This eliminates idle OP in the SSD allocation.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE FIGURES

The numerous advantages of the invention may be better understood with reference to the accompanying figures in which:

FIGS. 2A-C are conceptual diagrams illustrating the functionality of the SSD capacity expander.

DETAILED DESCRIPTION OF ILLUSTRATIVE EMBODIMENTS

The invention may be embodied in a solid state device (SSD) capacity expander for a computer system with an advanced storage device (ASD) system utilizing SSD cache memory. The SSD cache expander continually allocates all available excess overprovisioned space (OP) to the SSD cache while maintaining the advertised SSD memory level.

SSD based caching has been previously implemented as a feature of ASD systems. The performance of SSD cache depends, across many other factors, from the cache capacity itself. A key objective in ASD design is maximizing the cache capacity above an advertised cache level using otherwise hidden capabilities. When SSD memories are created, they include overprovisioned space (OP) meaning the actual physical space is higher that the advertised memory level, often by a significant factor. OP in the range 7%, 28%, or even 40% are typical in currently SSD memories. The main reason for this is to provide spare capacity that will be used in the course of device life to replace cell failures that are common in flash. Therefore, in order to meet the end of life advertised SSD capacity goal, a significant amount of excess OP capacity is typically provided at manufacturing time. But this excess OP capacity sits idle in conventional SSD systems. This disclosure recognizes that the OP capacity can be used to expand and manage the front end caching to expand the SSD cache memory available in the system.

Specifically, all of the excess OP capacity provided at manufacturing time is initially allocated to SSD cache so that all of the physical SSD memory available is utilized for cache. Over time, the excess OP is reclaimed as needed to offset physical SSD memory loss and maintain the advertised SSD memory. The total cache size therefore shrinks as portions of the SSD become unusable in the normal course of computer operations. As this occurs at any stage of SSD life and the excess OP is reduced, the SSD allocated to maintain the advertised capacity remains at the advertised level, and the full amount of available SSD memory is allocated to cache in the combination of the advertised SSD capacity plus the excess OP allocated to cache. The excess OP allocated to cache thus reduces over the life of the SSD to offset the loss of physical SSD capacity while the SSD advertised capacity is maintained and the total amount cache remains equal to the physical SSD capacity. This is maximizes the available SSD cache capacity, as that capacity is reduced over the life of the SSD.

Figure 1:
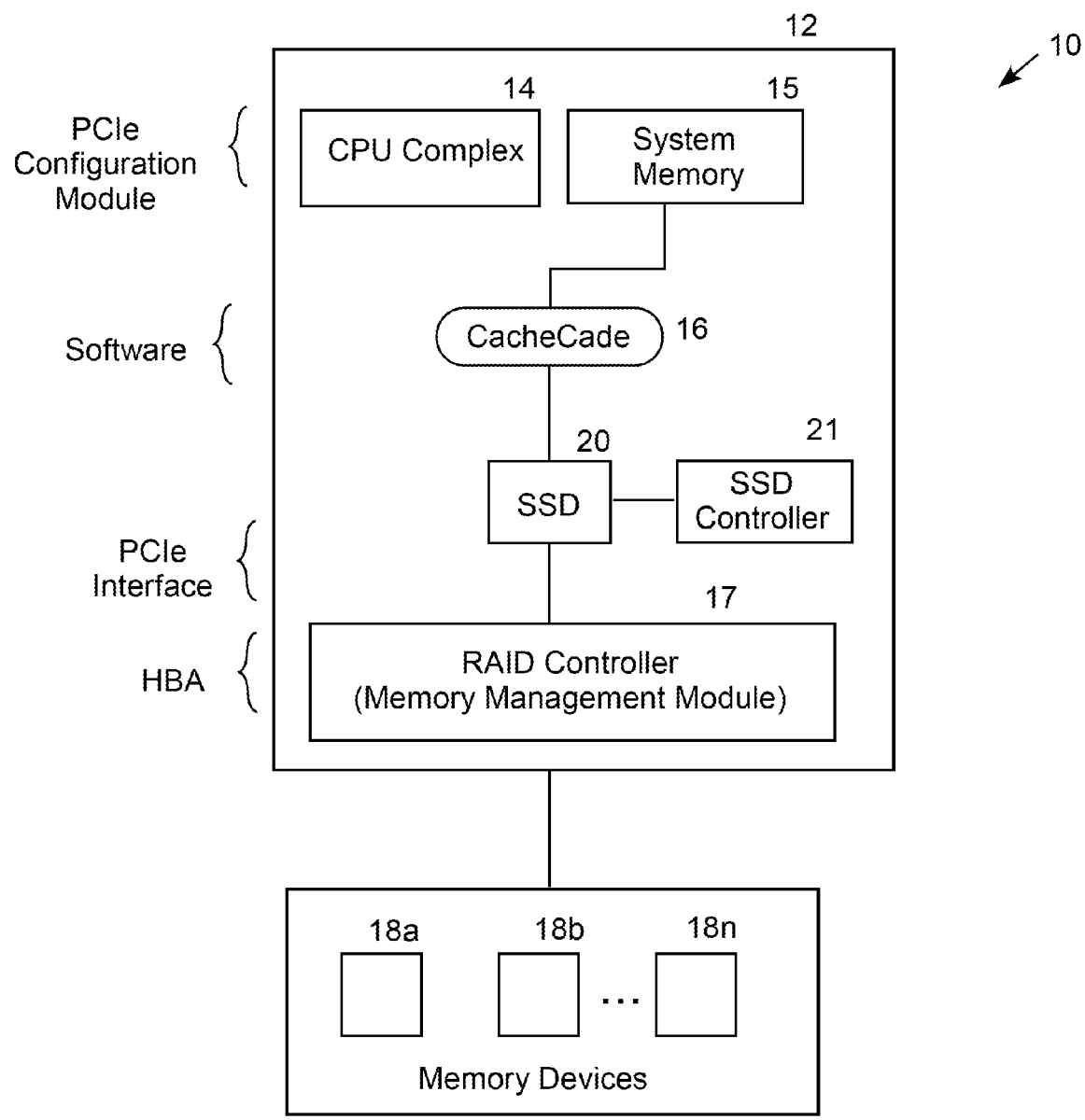
FIG. 1 is a functional block diagram of a typical, simplified example of a host computer system with an ASD system having SSD cache implementing the SSC capacity expander of the present invention.

FIG. 1 is a block diagram of a computer system 10 providing an example operating environment for the SSD cache expander. It will be appreciated that actual computer systems embodying the invention will vary in configuration and will typically be much more sophisticated than the minimal example shown in FIG. 1. Nevertheless, it will also be appreciated that FIG. 1 illustrates a simplified illustrative computer system with sufficient features to demonstrate the operation of the present invention.

The example computer system 10 includes host computer 12 includes a CPU complex 14 and a system memory 15 that utilize storage devices 18a-n in the ASD system in the ordinary course of computer operations. In this example a Cache-Cade 16 software module manages the SSD 20 while a RAID controller 17 mediates access to the ASD cache system storage devices 18a-n to implement a desired RAID storage protocol. It should be noted that the SSD can also be managed as RAID without changing the nature of the invention. The CacheCade 16 and the SSD 20 are typically located on the host motherboard and the RAID controller 17 is typically located on a Host Bus Adapter (HBA) connected to the motherboard via a Peripheral Component Interconnect Express (PCIe) bus interface. It will be understood that other CPUs, typically referred to as guest systems, may also access the storage devices 18a-n via the RAID controller 17. In addition, RAID is but one illustrative example of a computer application that may use the SSD capacity expander, which will be recognized as a generally applicable ASD feature independent of the type of RAID or ASD system.

The SSD expander also includes an SSD controller 21 that may be located as desired by the system designers. The host chipset typically includes a PCIe configuration module that may be configured to implement the SSD controller 21 to manage the SSD cache expansion system. Alternatively, the Cachecade 16 may be configured to implement the SSD controller 21. As another alternative, the HBA implementing the RAID controller 17 typically includes a memory management module that may be configured to implement the SSD controller 21. The SSD controller 21 may alternatively be implemented by a different component, or combination of components, as a matter of design choice.

FIGS. 2A-C are conceptual diagrams illustrating the SSD capacity expander within the operating environment of the illustrative computer system 10. FIG. 2A shows the initial memory allocation 24 of the SSD 20. The SSD includes an initial physical memory level 25, which is allocated to the advertised SSD cache memory capacity 26. The SSD also includes OP 28 provided at manufacturing time, which conventionally sits idle as unused space during normal computer operations until allocated to offset loss of physical SSD capacity. The objective of the present invention is to put all of the used space 28 into service as cache memory so that the cache includes all of the physical SSD memory 25 available during normal computer operations.

FIG. 2B illustrates the allocation of excess OP 30 to expand the SSD cache so that the total cache 32 is equal to the initial physical capacity of the SSD 25. That is, the advertised SSD capacity 26 and the excess OP allocated to cache 30 results in the total available cache 32 being initially equal to the total physical SSD memory 25. As that value is expected to diminish over time due to SSD capacity loss during ordinary computer operations, FIG. 2C illustrates the reallocation of a portion of the excess OP 34 to unused space to offset SSD capacity loss during ordinary computer operation. The adjusted cache 32' is therefore equal to the advertised cache 26 plus the adjusted allocation of OP 30' reduced by the offset the SSD capacity loss during ordinary computer operations 34. The result is that that the adjusted cache 32' is equal to the reduced physical capacity 25' of the SSD 25' and the OP allocated to cache 30' has been reduced to offset the SD capacity loss during ordinary computer operations 34.

Figure 3:
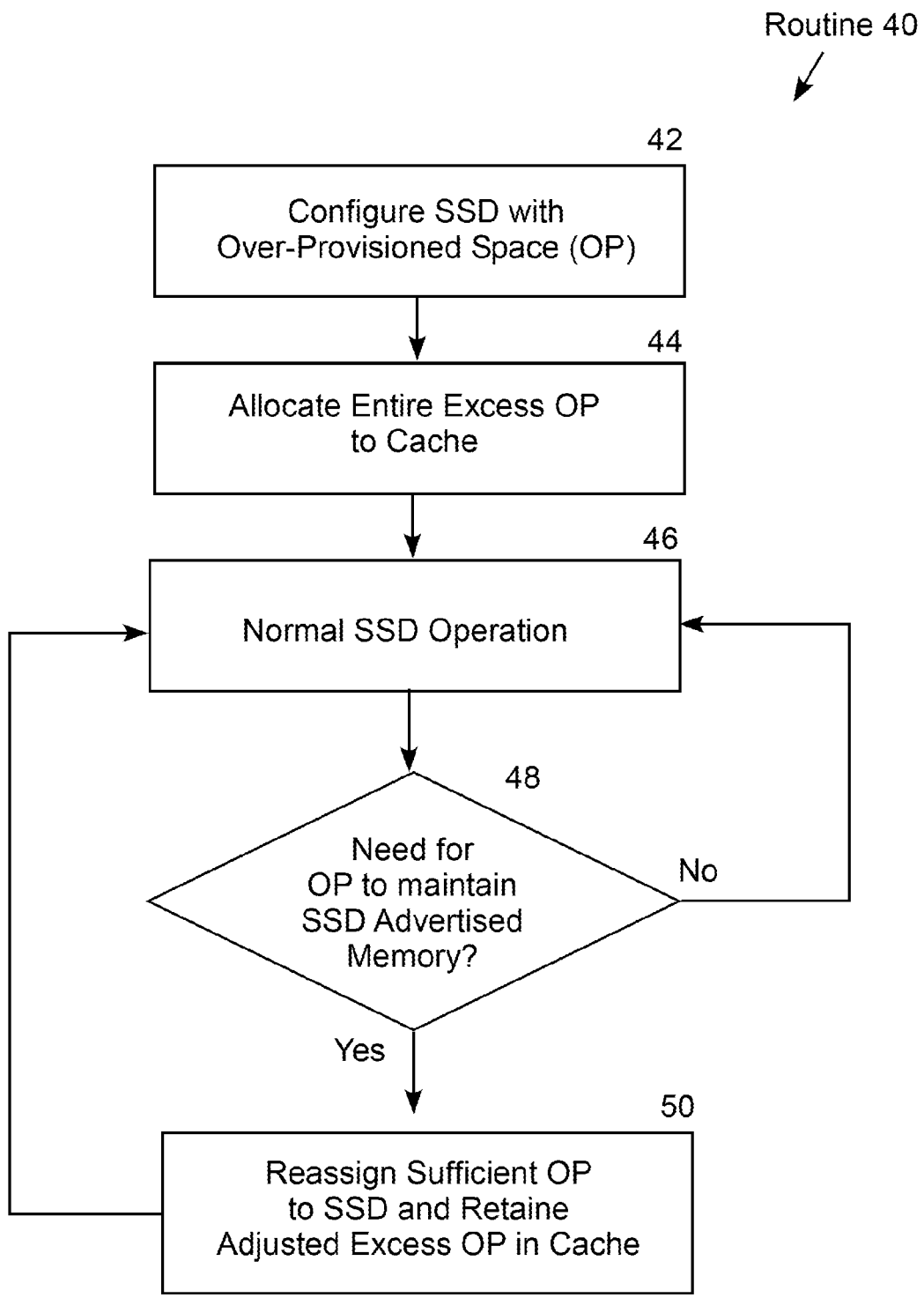
FIG. 3 is a logic flow diagram of the operation of the SSD capacity expander.

FIG. 3 is a logic flow diagram of Routine 40 for SSD OP utilization in an ASD system with SSD cache memory. In step 42, the SSD is configured at manufacturing time with over-provisioned space (OP). Prior to ordinary computer operations, typically during initialization of the SSD after installation on a host computer system, step 42 is followed by step 44, in which the entire excess OP is allocated to SSD cache. This results in the SSD cache being initially equal to the entire physical capacity of the SSD. Step 44 is followed by step 46, in which the SSD is utilized in normal computer operations. Step 46 is followed by step 48, in which the SSD controller determines whether SSD physical capacity has been lost and there is therefore a need to reallocate OP to maintain the advertised SSD level. So long as SSD physical capacity has not been lost, the "No" branch is followed from step 48 to step 46, in which normal computer operations continue without an adjustment in the SSD cache level. If SSD physical capacity has been lost, the "YES" branch is followed from step 48 to step 50, in which a sufficient amount of excess OP allocated to SSD cache is allocated to maintain the advertised SSD capacity. Step 50 is followed by step 46, in which normal computer operations continue with an adjustment in the SSD cache level to offset the loss of physical SSD memory. In this manner, the SSD cache level remains equal to the physical SSD memory as that value changed over time due to the loss of SD capacity during ordinary computer operations.

The present invention may consist (but not required to consist) of adapting or reconfiguring presently existing systems. Alternatively, original equipment may be provided embodying the invention.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. A solid state drive (SSD) cache capacity expander, comprising:
    a SSD memory having an initial physical memory capacity and excess overprovisioned memory comprising physical memory capacity above an advertised SSD cache memory capacity;
    a SSD controller configured to allocate the excess overprovisioned memory to SSD cache such that the SSD cache capacity is initially equal to the SSD physical memory capacity, the SSD controller further configured to detect a reduction in the physical memory capacity of the SSD during ordinary computer operations, the SSD controller further configured to reallocate a portion of the excess overprovisioned memory allocated to SSD to advertised SSD capacity to maintain the advertised capacity of the SSD while reducing the allocation of excess overprovisioned space (OP) to SSD cache such that the adjusted SSD cache capacity is equal to the adjusted SSD physical memory capacity.

2. The SSD cache capacity expander of claim 1, further comprising a cachecade.

3. The SSD cache capacity expander of claim 1, further comprising a peripheral component interconnect express (PCIe) management module implemented by a host chipset.

4. The SSD cache capacity expander of claim 1, further comprising a memory management module implemented by a host bus adapter.

5. The SSD cache capacity expander of claim 1, further comprising a redundant array of independent disks (RAID) controller mediating access to a plurality of memory storage devices, wherein the SSD cache is utilized in RAID operations.

6. The SSD cache capacity expander of claim 5, wherein the RAID controller is implemented on a PCIe host bus adapter (HBA) and the SSD controller is implemented by a memory management system on the HBA.

7. The SSD cache capacity expander of claim 6, further comprising a host computer system which includes a PCIe management module.

8. A computer system having an SSD cache capacity expander, comprising:
    a host computer system comprising a host chipset, a system memory, an SSD memory, and an SSD controller;
    the SSD memory having an initial physical memory capacity and excess overprovisioned memory comprising physical memory capacity above an advertised SSD cache memory capacity;
    the SSD controller configured to allocate the excess overprovisioned memory to SSD cache such that the SSD cache capacity is initially equal to the SSD physical memory capacity;

the SSD controller further configured to detect a reduction in the physical memory capacity of the SSD during ordinary computer operations; and the SSD controller further configured to reallocate a portion of the excess overprovisioned memory allocated to SSD to advertised SSD capacity to maintain the advertised capacity of the SSD while reducing the allocation of excess OP to SSD cache such that the adjusted SSD cache capacity is equal to the adjusted SSD physical memory capacity.

9. The computer system of claim 8, further comprising a cachecade.

10. The computer system of claim 8, further comprising a PCIe management module implemented by the host chipset.

11. The computer system of claim 8, further comprising a memory management module implemented by a host bus adapter.

12. The computer system of claim 8, further comprising a RAID controller mediating access to a plurality of memory storage devices, wherein the SSD cache is utilized in RAID operations.

13. The computer system of claim 12, wherein the RAID controller is implemented on a PCIe host bus adapter (HBA), and the SSD controller is implemented by a memory management system on the HBA.

14. The computer system of claim 13, wherein the host computer system further includes a PCIe management module.

15. A method for expanding SSD cache memory in a computer system, comprising the steps of:

providing a host computer system including a host chipset, a system memory, an SSD memory, and an SSD controller;

configuring the SSD memory with an initial physical memory capacity and excess overprovisioned memory comprising physical memory capacity above an advertised SSD cache memory capacity;

allocating the excess overprovisioned memory to SSD cache such that the SSD cache capacity is initially equal to the SSD physical memory capacity;

detecting a reduction in the physical memory capacity of the SSD during ordinary computer operations; and reallocating a portion of the excess overprovisioned memory allocated to SSD to advertised SSD capacity to maintain the advertised capacity of the SSD while reducing the allocation of excess OP to SSD cache such that the adjusted SSD cache capacity is equal to the adjusted SSD physical memory capacity.

16. The method of claim 15, further comprising the step of providing a cachecade.

17. The method of claim 16, further comprising the step of providing a PCIe management module implemented by the host chipset.

18. The method of claim 16, further comprising the step of providing a memory management module implemented by a host bus adapter.

19. The method of claim 16, further comprising the step of providing a RAID controller mediating access to a plurality of memory storage devices, wherein the SSD cache is utilized in RAID operations.

20. The method of claim 16, further comprising the step of implementing the RAID controller on a PCIe host bus adapter (HBA).

* * * * *